United States Patent [19]

Hirobe et al.

[11] Patent Number: 4,493,913

[45] Date of Patent: Jan. 15, 1985

[54] FLAME RESISTANT RESIN COMPOSITION

[75] Inventors: Kazushi Hirobe; Satoshi Tonoki; Masahiko Nishigaki, all of Kobe, Japan

[73] Assignee: Kanegafuchi Kagaku Kogyo Kabushiki Kaisha, Osaka, Japan

[21] Appl. No.: 450,277

[22] Filed: Dec. 16, 1982

[30] Foreign Application Priority Data

| Dec. 19, 1981 | [JP] | Japan | 56-205812 |
| May 15, 1982 | [JP] | Japan | 57-82153 |
| Nov. 1, 1982 | [JP] | Japan | 57-192200 |

[51] Int. Cl.$^3$ .......... C08K 3/32; C08K 3/02; C08K 9/10; C08K 9/04
[52] U.S. Cl. .................. 523/205; 523/209; 523/216; 524/80
[58] Field of Search ............ 523/205, 209, 216; 524/80

[56] References Cited

U.S. PATENT DOCUMENTS

| 3,847,861 | 11/1974 | Largman et al. | 524/431 |
| 3,883,475 | 5/1975 | Racky et al. | 524/414 |
| 3,897,384 | 7/1975 | Busgh et al. | 523/511 |
| 4,022,748 | 5/1977 | Schuchting et al. | 524/80 |
| 4,067,897 | 1/1978 | Ducloux | 524/80 |
| 4,145,369 | 3/1979 | Hira et al. | 523/205 |
| 4,193,907 | 3/1980 | Tacke et al. | 524/80 |
| 4,208,317 | 6/1980 | Cerny et al. | 523/205 |
| 4,362,839 | 12/1982 | Tonoki et al. | 524/513 |
| 4,403,052 | 9/1983 | Largman et al. | 524/80 |

FOREIGN PATENT DOCUMENTS

| 52217 | 5/1982 | European Pat. Off. . | |
| 2249910 | 4/1974 | Fed. Rep. of Germany | 524/80 |
| 48-4598 | 1/1973 | Japan . | |
| 94357 | 8/1978 | Japan | 524/80 |
| 1438153 | 6/1976 | United Kingdom . | |
| 1472787 | 5/1977 | United Kingdom . | |
| 1545716 | 5/1979 | United Kingdom . | |

OTHER PUBLICATIONS

Derwent Abst., 02146 C/02, BASF (1-1980), EP-6549.
Derwent Abst., 30334 A/17, Hoechst (4-1978), DE2655739.
Derwent Abst., 79288 E/38, Saffa SPA (9-1982), EP-59850.
Derwent Abst., 85623Y/48 (10-1977), J52125489.

*Primary Examiner*—Herbert J. Lilling
*Attorney, Agent, or Firm*—Armstrong, Nikaido, Marmelstein & Kubovcik

[57] ABSTRACT

A flame resistant resin composition comprising (a) a synthetic resin, (b) red phosphorus coated with a thermosetting resin and (c) a filler. The coated red phosphorus is useful as a flame retardant for various synthetic resins, particularly thermoplastic polyesters such as polyalkylene terephthalates, and can impart the flame resistance to the resins without impairing heat stability and electric characteristics. The use of the coated rod phosphorus in combination with talc is particularly preferred.

3 Claims, No Drawings

FLAME RESISTANT RESIN COMPOSITION

BACKGROUND OF THE INVENTION

The present invention relates to a synthetic resin composition having an excellent flame resistance, and more particularly to a flame resistant resin composition containing as a flame retarder a finely divided red phosphorus coated with a thermosetting resin.

It is known to employ halogen compounds with flame retarding assistants such as antimony trioxide to impart a flame resistance to synthetic resins. However, these known flame retarders have the disadvantages of lowering of physical property, including tensile strength, and bleeding due to bad dispersibility. It is disclosed in Japanese Unexamined Patent Publication (Tokkyo Kokai) No. 4598/1973 that a flame resistance can be imparted to polyester resins by addition of red phosphorus. However, in a combustion test of a polyester composition containing red phosporus according to UL-94 there is frequently observed the phenomenon that the burnt resin droplets cause cotton placed below to ignite, namely the so-called dripping phenomenon, and accordingly a stable, high flame resistance cannot be obtained by the use of red phosphorus. Also, since red phosphorus is subject to chemical reactions, a composition containing it has the disadvantage that the heat stability and the electric characteristics are lowered, to say nothing of difficulty in handling.

SUMMARY OF THE INVENTION

It has now been found that an excellent flame resistance can be imparted to synthetic resins without lowering heat stability and electric characteristics by incorporating a finely divided red phosphorus coated with a thermosetting resin.

In accordance with the present invention, there is provided a flame resistant resin composition comprising (a) a synthetic resin, (b) 1 to 70 parts of red phosphorus coated with a thermosetting resin and (c) 0.1 to 200 parts of a filler, said parts of (b) and (c) being parts by weight per 100 parts by weight of (a).

DETAILED DESCRIPTION

The thermosetting resin-coated red phosphorus used as a flame retardant in the present invention is phosphorus particles the surface of which is uniformly coated with a thermosetting resin. Any thermosetting resin capable of uniformly coating red phosphorus can be employed. Usually, the thermosetting resin is selected from a phenol-formaldehyde resin, a urea-formaldehyde resin, a melamine-formaldehyde resin and an alkyd resin. The coating of red phosphorus particles with a thermosetting resin is conducted, for instance, by adding raw materials of the thermosetting resin to an aqueous dispersion of red phosphorus particles with agitation and then conducting the polymerization, or by adding a previously prepared precondensation product for the thermosetting resin to an aqueous dispersion of red phosphorus particles with agitation and then conducting the polymerization. The thermosetting resin is employed in an amount capable of coating the surfaces of the red phosphorus particles. Usually, an amount of 0.5 to 200% by weight based on red phosphorus is sufficient. Upon the coating treatment, a dispersion stabilizer and a stabilizer for red phosphorus such as magnesium hydroxide may be added to the aqueous dispersion. After the polymerization procedure, the treated red phosphorus particles are filtered, washed with water and dried.

In the red phosphorus coated with a thermosetting resin, red phosphorus per se does not come into contact with air and moisture, and accordingly gains a strong resistance against them. Further, exposure of red phosphorus does not occur even in melt-blending with a synthetic resin, since the thermosetting resin coatings are not molten, and accordingly the resistance against air and moisture is not lost at all. Moreover, since the compatibility is increased, the flame retardant according to the invention can be uniformly dispersed.

The amount of the coated red phosphorus (b) capable of exhibiting a sufficient flame retarding effect is from 1 to 70 parts by weight, preferably 2 to 50 parts by weight, more preferably 2 to 45 parts by weight, per 100 parts by weight of a synthetic resin (a). When the amount is less than 1 parts by weight, the flame retarding effect is small, and when the amount is more than 70 parts by weight, the quality may become unstable.

The coated red phosphorus may be employed, if necessary, in combination with other flame retardants in order to obtain a synergistic effect, e.g. halogenated diphenyl ether compounds, halogenated polycarbanate compounds, halogenated polyphenylene oxide compounds, halogen-containing sym-triazine compounds and halogenated biphenyl type epoxy resins. Also, the coated red phosphorus may be employed in combination with flame retarding assistants such as antimony trioxide, antimony pentaoxide and antimony tartrate.

The coated red phosphorus (b) according to the present invention is applicable as flame retardants to various thermoplastic and thermosetting synthetic resins. The synthetic resins include, for instance, polyolefine resins such as polyethylene, polypropylene, polybutylene and polybutadiene; styrene resins such as polystyrene, acrylonitrile/butadiene/styrene copolymer and acrylonitrile/styrene copolymer; halogenated vinyl resins such as vinyl chloride/vinyl acetate copolymer; acrylic resins such as polyacrylic acid, acrylate polymers and methacrylate polymers; thermoplastic polyesters, e.g. a polyalkylene terephthalate resin such as polyethylene terephthalate, polypropylene terephthalate or polybutylene terephthalate, and a modified polyethylene terephthalate resin; polyamide resins such as Nylon-6, Nylon-66 and Nylon-12; polycarbonate resins; polyphenylene ether resins; polyurethane resins; epoxy resins; phenol resins; urea resins; melamine resins; alkyd resins; and mixtures thereof. The synthetic resins used as a component (a) in the present invention are not limited to the above exemplified resins.

The coated red phosphorus flame retardant is particularly useful for use in compositions containing thermoplastic polyester resins, especially polyalkylene terephthalate resins, more especially modified polyethylene terephthalate resins. The thermoplastic polyester resins as used herein are those prepared by direct esterification or ester interchange followed by plycondensation from a dicarboxylic acid component at least 90% by mole of which is terephthalic acid and a diol component at least 90% by mole of which is ethylene glycol, propane-1,3-diol, butane-1,4-diol, pentane-1,5-diol, hexane-1,6-diol or cyclohexane-1,4-dimethanol. In the thermoplastic polyester resins, 0 to 10% by mole of the dicarboxylic acid component may be other aromatic dicarboxylic acids having 6 to 14 carbon atoms, aliphatic dicarboxylic acids having 4 to 8 carbon atoms or alicyclic dicarboxylic acids having 8 to 12 carbon atoms. Examples of such dicarboxylic acids are phthalic acid, isophthalic acid, 2,6-naphthalene dicarboxylic acid, 4,4'-diphenyl dicarboxylic acid, diphenylethane-4,4'-dicarboxylic acid, adipic acid, sebacic acid, cyclohexane dicarboxylic acid, and the like. Also, 0 to 10% by mole of the diol component may be other aliphatic diols having 3 to 10 carbon atoms, other alicyclic diols having 6 to 15 carbon atoms or aromatic diols having 6 to 12 carbon atoms. Examples of such diols are 2,2-dimethylpropane-1,3-diol, 2,2-bis(4'-hydroxycyclohexyl)propane, 2,2-bis(4'-hydroxyphenyl)propane, hydroquinone, and the like. A hydroxycarboxylic acid such as ε-oxycaproic acid or hydroxybenzoic acid may be copolymerized in an amount of at most 10% by mole of the dicarboxylic acid and diol components. Also, the thermoplastic polyester resins may of course be branched by trihydric or tetrahydric alcohols, or tribasic or tetrabasic acids. Suitable branching agents include, for instance, trimesic acid, trimellitic acid, trimethylolpropane and pentaerythritol.

Among the thermoplastic polyester resins, modified polyethylene terephthalate resins having a heating crystallization temperature Tc(H) of not more than 120° C. are particularly preferred. The term "heating crystallization temperature Tc(H)" as used herein means a crystallization temperature measured by heating a resin of the glass state at a rate of 10° C./minute from room temperature employing a differential scanning calorimeter. The modified polyethylene terephthalate resins are obtained by introducing a modifier component to a product of polycondensation, after direct esterification or ester interchange, of a dicarboxylic acid component containing at least 90% by mole of terephthalic acid and a diol component containing at least 90% by mole of ethylene glycol. Up to 10% by mole of the dicarboxylic acid component may be other aromatic dicarboxylic acids having 6 to 14 carbon atoms, aliphatic dicarboxylic acids having 4 to 8 carbon atoms, or alicyclic dicarboxylic acids having 8 to 12 carbon atoms, such as phthalic acid, isophthalic acid, 2,6-naphthalene-dicarboxylic acid, 4,4'-diphenyldicarboxylic acid, diphenylethane-4,4'-dicarboxylic acid, adipic acid, sebacic acid and cyclohexanedicarboxylic acid. Also, up to 10% by mole of the diol component may be aliphatic diols having 3 to 10 carbon atoms, alicyclic diols having 6 to 15 carbon atoms or aromatic diols having 6 to 12 carbon atoms, such as propane-1,3-diol, butane-1,4-diol, pentane-1,5-diol, hexane-1,6-diol, cyclohexane-1,4-dimethanol, 2,2-dimethylpropane-1,3-diol, 2,2-bis(4'-hydroxycyclohexyl)propane, 2,2-bis(4'-hydroxyphenyl)propane and hydroquinone.

The modification of polyethylene terephthalate can be made by copolymerization and/or mixing of polyethylene terephthalate with a modifier. An advantageous process is selected according to the kinds of the modifiers. The amount of the modifiers varies depending on the kinds of the modifiers, and the modifiers are employed in such an amount that the heating crystallization temperature Tc(H) becomes at most 120° C. When a balance such as moldability and physical properties are considered, the object is attained by the use of a modifier in an amount of 4 to 40% by weight.

Various compounds capable of making the heating crystallization temperature Tc(H) 120° C. or below can be employed as modifiers to be incorporated in or blended with polyethylene terephthalate. Typical examples of the modifiers are given below.

(1) Polyoxyalkylene compounds:
  (a) Polyalkylene glycols: polyethylene glycol, polypropylene glycol, polytetramethylene glycol
  (b) Polyoxyalkylene compounds having metal salts of organic acids: patassium salts of mono- and di-succinic acid esters, potassium, calcium, zinc and aluminum salts of mono- and di-phthalic acid esters and sodium salts of mono- and di-tetrabromophthalic acid esters of polyethylene glycol, polypropylene glycol, polytetramethylene glycol and ethylene oxide-propylene oxide copolymer; sodium salt of mono-trimellitic acid ester of monomethoxypolyethylene glycol; sodium salts of mono-, di-, tri- and tetra-phthalic acid esters or mono-, di-, tri- and tetra-bromophthalic acid esters of glycerolalkylene oxide adduct and trimethylolpropanealkylene oxide adduct; sodium and calcium salts of sulfonic acid or phosphoric acid of mono-, di-, tri- and tetra-phenyl ethers of polyethylene glycol, polypropylene glycol, polytetramethylene glycol, ethylene oxide-propylene oxide copolymer and polyhydric alcohol-alkylene oxide adduct
  (c) Polyoxyalkylene compounds having epoxy group: mono- and di-glycidyl ethers of polyethylene glycol, polypropylene glycol, polytetramethylene glycol and ethylene oxide-propylene oxide copolymer; monoglycidyl ethers of methoxypolyethylene glycol and ethoxypolyethylene glycol; glycidyl ethers of glycerol-alkylene oxide adduct, trimethylolpropane-alkylene oxide adduct and pentaerythritol-alkylene oxide adduct
  (d) Polyoxyalkylene compounds having hydrocarbon group: mono- and di-nonylphenyl ethers, mono- and di-octylphenyl ethers, mono- and di-oleyl ethers, mono- and di-stearyl ethers, mono- and di-lauryl ethers and mono- and di-palmityl ethers of polyethylene glycol, polypropylene glycol, polytetramethylene glycol and ethylene oxide-propylene oxide copolymer; mono-nonylphenyl ether and monooctylphenyl ether of methoxypolyethylene glycol and ethoxypolyethylene glycol; nonylphenyl ether and octylphenyl ether of glycerolalkylene oxide adduct, trimethylolpropane-alkylene oxide adduct and pentaerythritol-alkylene oxide adduct (2) Low molecular organic esters:
  neopentyl glycol dibenzoate, diethylene glycol dibenzoate, triethylene glycol dibenzoate, dipropylene glycol dibenzoate, tris-2-ethylhexyl trimellitate, phenyl benzoate, pentaerythritol tetrabenzoate, dioctyl phthalate, dioctyl adipate, trioctyl phosphate, tricresyl phosphate, triphenyl phosphate, di-(2-ethylhexyl) adipate, diisononyl adipate, dibutyl adipate, butane-1,3-diol adipate oligomer, butane-1,4-diol adipate oligomer, hexane-1,6-diol adipate oligomer, dibutyl sebacate, dioctyl sebacate (3) Ionic copoloymers which are salts of copolymers of α-olefins and α,β-unsaturated dicarboxylic acids: sodium, potassium or zinc salts of ethylene/maleic acid copolymer, ethylene/methacrylic acid copolymer, ethylene/itaconic acid copolymer and styrene/maleic anhydride copolymer, in which the carboxylic acid may be partially or completely neutralized (4) Organic acid salts, inorganic acid salts and metal oxides:
  (a) Organic acid salts:
    sodium acetate, sodium benzoate, monosodium phthalate, disodium phthalate, magnesium stearate, calcium stearate, sodium stearate, sodium palmitate (b) Inorganic salts:
sodium carbonate, calcium carbonate, calcium silicate, magnesium silicate, calcium sulfate, magnesium sulfate, barium sulfate (c) Metal oxides:
zinc oxide, magnesium oxide, titanium oxide The modifiers used for modifying polyethylene terephthalate are not limited to the above exemplified compounds. The modifiers are employed alone or in admixture thereof.

Among the modified polyethylene terephthalate resins, polyethylene terephthalate modified with a polyoxyalkylene compound, especially a polyoxyalkylene compound having a metal salt of an organic acid is particularly preferred.

A reinforcing filler is incorporated in the composition of the present invention for the purpose of increasing mechanical strength, heat resistance and dimentional stability. Fibrous, sheet-like or particulate inorganic fillers are employed as a reinforcing filler. Examples of the filler used in the present invention are, for instance, glass fiber, mineral fiber, carbon fiber, silicon carbide fiber, boron carbide fiber, potassium titanate fiber, gypsum fiber, mica, talc, kaolin clay, asbestos, calcium silicate, calcium sulfate, calcium carbonate, and the like. Glass fiber, mica, talc and mineral fiber are particularly preferred. The fillers may be employed alone or in admixture thereof. Also, the fillers may be treated with a silane coupling agent in order to improve the compatibility with resins. The filler is employed in an amount of 0.1 to 200 parts by weight per 100 parts by weight the synthetic resin (a). Preferably, the amount of the filler is selected from 10 to 125 parts by weight per 100 parts by weight of the resin (a) in consideration of mechanical strength, heat resistance and flowability. The suitable amount is determined according to the desired quality.

It has been found that when the coated red phosphorus (b) is employed in combination with talc, the flame resistance is further improved while the heat stability and electric characteristics are maintained higher. Talc may be represented by the general formula: $3MgO.4SiO_2.nH_2O$, and all kinds of talc put on the market can be employed in the present invention. The amount of talc is selected from 2 to 170 parts by weight, preferably 5 to 80 parts by weight, per 100 parts by weight of the synthetic resin (a). When the amount is less than 2 parts by weight, the dripping and electric characteristics are not improved, and when the amount is more than 170 parts by weight, the mechanical property may be decreased.

The composition of the present invention may contain other additives such as antioxidant, light stabilizer, pigment, dye, plasticizer and lubricant in such an amount as not imparing the flame resistance and physical properties. Also, the polyester resin composition may contain, for the purpose of improving mechanical and electric properties, other resins such as polyamide and polycarbonate, and theroplastic rubbers such as diene rubber, acrylic rubber, butyl rubber, ethylene-propylene copolymer, ethylene-vinyl acetate copolymer, urethane rubber, epichlorohydrin rubber and silicone rubber.

The composition of the present invention can be prepared by mixing the synthetic resin (a) and the coated red phosphorus with or without a filler and other additives in a known manner. For instance, there are adopted a process in which additives are added and incorporated upon the preparation of the synthetic resin and a process in which components are mixed and extruded by employing an extruder.

According to the present invention, it is possible to obtain a composition having excellent flame resistance, heat stability and electric characteristics without imparing the moldability and appearance of molded articles. The composition of the invention can be widely utilized in molding of various molded articles, pipe and vessels, and in particular, it can be suitably utilized as electric parts, building materials and automobile parts. The composition is also usable as fiber, film and sheet.

The present invention is more specifically described and explained by means of the following Examples, in which all parts and % are by weight unless otherwise noted. It is to be understood that the present invention is not limited to the Examples, and various changes and modifications may be made in the invention without departing from the spirit and scope thereof.

In the following Examples, physical properties of molded articles were measured by the following methods.

Tensile strength: according to ASTM-D638

Heat deflection temperature (under load of 18.6 kg./cm.$^2$): according to ASTM-D648

Flame resistance: vertical testing method according to UL-94

Arc resistance: according to ASTM-D495

Heat stability: evaluated by retention rate of tensile strength after allowing a molded article to stand in an oven at 180° C. for 7 days.

Also, the inherent viscosity $[\eta]$ of a modified polyethylene terephthalate resin was obtained from logarithmic viscosity measured at 25° C. by employing a solution in a phenol/tetrachloroethane mixed solvent (1/1 by weight) having a concentration of 0.5 g/dl. The melting point Tm, the cooling crystallization temperature Tc(C) in cooling from the molten state and the heating crystallization temperature Tc(H) in heating from the glass state of a modified polyethylene terephthalate resin were measured by a differential scanning calorimeter type IB made by Perkin Erma Co.

EXAMPLES 1 TO 3 AND COMPARATIVE EXAMPLE 1

[Preparation of red phosphorus coated with phenol resin]

To a 500 ml. autoclave equipped with a stirrer was added 200 ml. of water, and 100 g. of finely divided red phosphorus was dispersed in water. To the dispersion were added 3 g. of phenol and a 37% aqueous solution of formaldehyde (phenol/formaldehyde=1/2.2 by mole), and phenol was dissolved. The dispersion was heated to 80° C. with vigorous agitation and a slight amount of phosphoric acid was added. After agitating at 80° C. for 1 hour, the dispersion was cooled to room temperature, and the filtration and washing with water were conducted. The red phosphorus particles filtered off were heated in an oven at 140° C. for 3 hours to remove water with completion of hardening of the phenol resin. Thus, red phosphorus coated with the phenol resin (hereinafter referred to as "coated red phosphorus") was obtained. The phosphorus content in the coated red phosphorus was 85%.

[Preparation of a composition]

Polyethylene terephthalate, coated red phosphorus, a processed mineral fiber and a glass fiber having a fiber length of 3 mm. were blended by extrusion in the weight ratio shown in Table 1, and the blend was molded by injection molding to give test specimens.

Properties of the molded articles are shown in Table 1.

It is observed in Table 1 that the compositions has excellent flame resistance, arc resistance and heat stability.

Also, the above procedure was repeated except that red phosphorus was employed instead of the coated red phosphorus (Comparative Example 1). The results are shown in Table 1, from which it is understood that the arc resistance and heat stability are bad, though the flame resistance is obtained by the use of red phosphorus.

TABLE 1

|  | Ex. 1 | Ex. 2 | Ex. 3 | Com. Ex. 1 |
|---|---|---|---|---|
| Polyethylene terephthalate | 62 | 58.5 | 55 | 55 |
| Coated red phosphorus | 3 | 6.5 | 10 | — |
| Red phosphorus | — | — | — | 10 |
| Mineral fiber | 30 | 30 | 30 | 30 |
| Glass fiber | 5 | 5 | 5 | 5 |
| Tensile strength (kg./cm.$^2$) | 890 | 901 | 883 | 864 |
| Heat deflection temp. (°C.) | 195 | 201 | 200 | 196 |
| Flame resistance |  |  |  |  |
| UL-94 ⅛ inch | V-0 | V-0 | V-0 | V-0 |
| 1/16 inch | V-2 | V-0 | V-0 | V-0 |
| 1/32 inch | V-2 | V-0 | V-0 | V-0 |
| Arc resistance (sec.) | 150 | 150 | 140 | 70 |
| Heat stability (%) | 73 | 70 | 70 | 58 |

EXAMPLES 4 AND 5

Polyethylene terephthalate, the coated red phosphorus obtained in Example 1, a glass fiber having a fiber length of 3 mm. and talc were blended in the weight ratio shown in Table 2 by extrusion, and test specimens were prepared from the blend by injection molding.

The results of the measurement of the properties are shown in Table 2. It is observed in Table 2 that the compositions have excellent flame resistance, arc resistance and heat stability.

TABLE 2

|  | Ex. 4 | Ex. 5 |
|---|---|---|
| Polyethylene terephthalate | 54 | 45 |
| Coated red phosphorus | 6 | 5 |
| Glass fiber | 30 | 30 |
| Talc | 10 | 20 |
| Tensile strength (kg./cm.$^2$) | 1402 | 1350 |
| Heat deflection temp. (°C.) | 225 | 223 |
| Flame resistance |  |  |
| UL-94 ⅛ inch | V-0 | V-0 |
| 1/16 inch | V-0 | V-0 |
| 1/32 inch | V-2 | V-0 |
| Arc resistance (sec.) | 165 | 170 |
| Heat stability (%) | 78 | 80 |

EXAMPLES 6 TO 8 AND COMPARATIVE EXAMPLE 2

There were blended a modified polyethylene terephthalate resin A ($[\eta]=0.73$, Tm=250° C., Tc(H)=96° C., Tc(C)=212° C.) containing 10% of trimellitic acid monoester disodium salt with polyethylene glycol having an average molecular weight of 1,740, the coated red phosphorus obtained in Example 1, a processed mineral fiber and a glass fiber having a fiber length of 3 mm. in the weight ratio shown in Table 3. Test specimens were prepared from the blend by injection molding.

The reslts are shown in Table 3.

It is observed in Table 3 that the mechanical property is not impaired and that the compositions have excellent flame resistance, arc resistance and heat stability.

Also, the above procedure was repeated except that red phosphorus was employed instead of the coated red phosphorus (Comparative Example 2). The results are shown in Table 3, from which it is understood that the arc resistance and heat stability are bad, though the flame resistance is obtained by the use of red phosphorus.

TABLE 3

|  | Ex. 6 | Ex. 7 | Ex. 8 | Com. Ex. 2 |
|---|---|---|---|---|
| Modified resin A | 60 | 58 | 55 | 55 |
| Coated red phosphorus | 5 | 7 | 10 | — |
| Red phosphorus | — | — | — | 10 |
| Mineral fiber | 30 | 30 | 30 | 30 |
| Glass fiber | 5 | 5 | 5 | 5 |
| Tensile strength (kg./cm.$^2$) | 902 | 885 | 863 | 826 |
| Heat deflection temp. (°C.) | 196 | 201 | 202 | 196 |
| Flame resistance |  |  |  |  |
| UL-94 ⅛ inch | V-0 | V-0 | V-0 | V-0 |
| 1/16 inch | V-0 | V-0 | V-0 | V-0 |
| 1/32 inch | V-2 | V-2 | V-0 | V-0 |
| Arc resistance (sec.) | 148 | 145 | 140 | 77 |
| Heat stability (%) | 81 | 83 | 80 | 58 |

EXAMPLES 9 TO 11

The same modified polyethylene terephthalate resin A as in Example 6, the coated red phosphorus obtained in Example 1, a glass fiber having a fiber length of 3 mm. and talc were blended by extrusion in the weight ratio shown in Table 4, and test specimens were prepared from the blend by injection molding.

The results are shown in Table 4.

TABLE 4

|  | Ex. 9 | Ex. 10 | Ex. 11 |
|---|---|---|---|
| Modified resin A | 58.5 | 54 | 48 |
| Coated red phosphorus | 6.5 | 6 | 7 |
| Glass fiber | 25 | 20 | 20 |
| Talc | 10 | 20 | 25 |
| Tensile strength (kg./cm.$^2$) | 1424 | 1305 | 1230 |
| Heat deflection temp. (°C.) | 228 | 225 | 228 |
| Flame resistance |  |  |  |
| UL-94 ⅛ inch | V-0 | V-0 | V-0 |
| 1/16 inch | V-0 | V-0 | V-0 |
| 1/32 inch | V-2 | V-0 | V-0 |
| Arc resistance (sec.) | 160 | 175 | 183 |
| Heat stability (%) | 75 | 82 | 80 |

EXAMPLES 12 TO 14

There were blended 63 parts of a modified polyethylene terephthalate resin B ($[\eta]=0.72$, Tm=252° C., Tc(H)=107° C., Tc(C)=182° C.) containing 10% of polyethylene glycol having an average molecular weight of 2,000, 7 parts of the coated red phosphorus obtained in Example 1 and 30 parts of a glass fiber having a fiber length of 3 mm. Test specimens were prepared from the blend by injection molding.

The above procedure was repeated except that instead of the modified resin B, there were employed respectively a modified polyethylene terephthalate resin C ($[\eta]=0.70$, Tm=253° C., Tc(H)=116° C., Tc(C)=195° C.) containing 7% of polyoxyethylene monononylphenyl ether having an average molecular weight of 2,410 and a modified polyethylene terephtharate resin D ($[\eta]=0.72$, Tm=250° C., Tc(H)=119° C., Tc(C)=174° C.) containing 5% of polyoxyethylene glycidyl ether having an average molecular weight of 308.

The results are shown in Table 5.

It is observed in Table 5 that an excellent flame resistance is obtained without impairing the mechanical property and moreover the arc resistance and heat stability are excellent.

TABLE 5

|  | Ex. 12 | Ex. 13 | Ex. 14 |
| --- | --- | --- | --- |
| Modified resin | B | C | D |
| Tensile strength (kg./cm.$^2$) | 1320 | 1240 | 1355 |
| Heat deflection temp. (°C.) | 216 | 215 | 220 |
| Flame resistance |  |  |  |
| UL-94 ⅛ inch | V-0 | V-0 | V-0 |
| 1/16 inch | V-0 | V-0 | V-0 |
| Arc resistance (sec.) | 140 | 134 | 138 |
| Heat stability (%) | 65 | 66 | 72 |

EXAMPLES 15 TO 17 AND COMPARATIVE EXAMPLE 3

The same midified resin A as used in Examples 6 to 8, the coated red phosphorus, a processed mineral fiber and a galss fiber having a fiber length of 3 mm. were blended with or without talc by extrusion in the weight ratio shown in Table 6, and test specimens were prepared from the blend by injection molding.

The results are shown in Table 6. It is observed in Table 6 that the compositions of the invention have excellent flame resistance, mechanical property, arc resistance and heat stability.

Also, the above procedure was repeated except that red phosphorus was employed instead of the coated red phosphorus (Comparative Example 3). The results are shown in Table 6.

TABLE 6

|  | Ex. 15 | Ex. 16 | Ex. 17 | Com. Ex. 3 |
| --- | --- | --- | --- | --- |
| Modified resin A | 59 | 57 | 57 | 57 |
| Coated red phosphorus | 6 | 8 | 8 | — |
| Red phosphorus | — | — | — | 8 |
| Talc | 10 | 15 | — | 15 |
| Mineral fiber | 20 | 15 | 30 | 15 |
| Glass fiber | 5 | 5 | 5 | 5 |

TABLE 6-continued

|  | Ex. 15 | Ex. 16 | Ex. 17 | Com. Ex. 3 |
| --- | --- | --- | --- | --- |
| Tensile strength (kg./cm.$^2$) | 812 | 820 | 880 | 723 |
| Heat deflection temp. (°C.) | 203 | 205 | 197 | 196 |
| Flame resistance |  |  |  |  |
| UL-94 ⅛ inch | V-0 | V-0 | V-0 | V-0 |
| 1/16 inch | V-0 | V-0 | V-0 | V-0 |
| 1/32 inch | V-2 | V-0 | V-2 | V-0 |
| Dripping | none | none | none | none |
| Arc resistance (sec.) | 150 | 162 | 140 | 115 |
| Heat stability (%) | 86 | 85 | 80 | 52 |

EXAMPLE 18

There were blended 52 parts of polybutylene terephthalate, 8 parts of the coated red phosphorus obtained in Example 1, 20 parts of a glass fiber having a fiber length of 3 mm. and 20 parts of talc. Test specimens were prepared from the blend by injection molding, and the properties were measured. The flame resistance according to UL-94 (1/32 inch in thickness) was V-0, the arc resistance was 170 sec. and the heat stability was 90%, thus the composition had excellent flame resistance, electric characteristic and heat stability.

In addition to the ingredients used in the Examples, other ingredients can be used in the Examples as set forth in the specification to obtain substantially the same results.

What we claim is:

1. A flame resistant resin composition comprising:
   (a) a modified polyethylene terephthalate having a heating crystallization temperature of not more than 120° C.,
   (b) 1 to 70 parts of red phosphorus coated with a thermosetting resin, and
   (c) 0.1 to 200 parts of a filler, said modified polyethylene terephthalate being a polycondensation product of a dicarboxylic acid component containing at least 90% by mole of terephthalic acid and a diol component containing at least 90% by mole of ethylene glycol and being modified with a modifier selected from the group consisting of a polyoxyalkylene compound, a low molecular organic ester and an ionic copolymer, and said parts of (b) and (c) being parts by weight per 100 parts by weight of (a).

2. The composition of claim 1, wherein said filler is talc.

3. The composition of claim 2, wherein the amount of talc is from 2 to 170 parts by weight per 100 parts by weight of the component (a).

* * * * *